US006624222B2

(12) United States Patent
Kestyn et al.

(10) Patent No.: US 6,624,222 B2
(45) Date of Patent: Sep. 23, 2003

(54) ENVIRONMENTALLY SAFE PAINT STRIPPER EMULSION

(75) Inventors: Paul E. Kestyn, Greenfield, MA (US); Augustin T. Chen, Cheshire, CT (US); Hong Zhao, Millbury, MA (US)

(73) Assignee: UCB CHIP Inc., Wilmington, DE (US)

( * ) Notice: Subject to any disclaimer, the term of this patent is extended or adjusted under 35 U.S.C. 154(b) by 177 days.

(21) Appl. No.: 09/768,408

(22) Filed: Jan. 24, 2001

(65) Prior Publication Data

US 2001/0036988 A1 Nov. 1, 2001

Related U.S. Application Data

(60) Provisional application No. 60/177,760, filed on Jan. 24, 2000.

(51) Int. Cl.$^7$ ................................................. C08K 5/10
(52) U.S. Cl. ........................................ 524/314; 524/557
(58) Field of Search .................................. 524/314, 557

(56) References Cited

U.S. PATENT DOCUMENTS

| | | | | |
|---|---|---|---|---|
| 3,249,489 A | * | 5/1966 | Lavin et al. ................. | 156/106 |
| 3,329,637 A | * | 7/1967 | Vitalis ......................... | 106/10 |
| 3,953,386 A | * | 4/1976 | Murphy et al. ............. | 524/716 |
| 4,009,136 A | * | 2/1977 | Lewandowski et al. ..... | 523/171 |
| 4,011,388 A | * | 3/1977 | Murphy et al. ............. | 524/733 |
| 4,017,444 A | * | 4/1977 | Mont et al. .................. | 524/140 |
| 5,030,290 A | * | 7/1991 | Davis .......................... | 134/38 |
| 5,137,954 A | | 8/1992 | DasGupta et al. .......... | 524/284 |
| 5,159,007 A | * | 10/1992 | Saitoh et al. ................ | 524/296 |

FOREIGN PATENT DOCUMENTS

| | | |
|---|---|---|
| DE | 3235899 | 4/1984 |
| EP | 376687 | 7/1990 |
| JP | 52018737 | 2/1977 |
| JP | 61223071 | 10/1986 |

OTHER PUBLICATIONS

SANTOSOL®, Dimethyl Esters Properties and Uses, Coating Performance Materials, Publication No. 2149204B, Solutia Inc., 1998.

* cited by examiner

*Primary Examiner*—Judy M. Reddick
(74) *Attorney, Agent, or Firm*—Lathrop & Gage LC

(57) ABSTRACT

Environmentally safe, e.g. biodegradable, paint stripper compositions comprising 10–99 parts dimethyl esters of $C_4$–$C_6$ aliphatic dibasic acids, 0.1–40 parts polyvinyl butyral and 1–90 parts water. The compositions can be mixed, e.g. in high shear to provide stable emulsions which strip paint, e.g. varnish from wood. Certain embodiments of the invention also comprise water soluble organic solvents, water-miscible organic solvents, surfactants, emulsifiers, thickeners and/or pigments.

2 Claims, No Drawings

ENVIRONMENTALLY SAFE PAINT STRIPPER EMULSION

RELATED APPLICATION

This application is a non-provisional application which claims the priority of prior provisional application serial No. 60/177,760, entitled "ENVIRONMENTALLY SAFE PAINT STRIPPER", filed Jan. 24, 2000, which is hereby incorporated by reference into this application.

FIELD OF INVENTION

Disclosed herein is an environmentally safe paint stripper composition and methods of making and using the paint stripper.

As used herein the term "DME" refers to mixtures of dimethyl esters of aliphatic dibasic organic acids, preferably $C_4$–$C_6$ aliphatic dibasic acids, i.e., succinic acid, glutaric acid and adipic acid, respectively. A mixture of such esters is or can be a byproduct of the manufacture of adipic acid and is formed by esterifying a byproduct acid stream with methanol. Although such byproduct mixture of dimethyl esters varies, it is generally about 15 to 30 wt % succinate, about 50 to 73 wt % glutarate and about 6 to 25 wt % adipate. DMEs are available from Solutia Inc., St. Louis, Mo. and E.I. duPont de Nemours and Company, Wilmington, Del. The ratio of dimethyl ester components in a DME mixture can vary from 1–98 parts for each of the three components depending on availability of components. In the following examples, DME-1 is a mixture of about 17–25% dimethyl succinate, 59–73 wt % dimethyl glutarate and 10–14 wt % dimethyl adipate.

As used herein the term "PVB" refers to polyvinyl butyral resin, preferably as a dry, free-flowing powder. PVB resin is produced by known aqueous or solvent acetalization processes reacting polyvinyl alcohol (PVOH) with butyraldehyde in the presence of acid catalyst, followed by neutralization of the catalyst, separation, stabilization and drying of the reaction product polymeric resin. PVB useful in this invention can have a degree of acetalization of 0.1–99 mole % acetal, preferably 50–95 mole % acetal, more preferably 70–85 mole % acetal. PVB typically has about 15 to 22 wt % hydroxyl groups calculated as PVOH and up to 10 wt %, preferably 0 to 3 wt %, residual ester groups calculated as polyvinyl ester, e.g. acetate, the balance being acetal, preferably butyraldehyde acetal, but optionally including a minor amount of acetal groups other than butyral, for example 2-ethyl hexanal as disclosed in U.S. Pat. No. 5,137,954. PVB is available from Solutia Inc., St. Louis, Mo. and E.I. duPont de Nemours and Company, Wilmington, Del. In the following examples PVB-1 has a weight average molecular weight (Mw) in the range of 30,000 to 40,000 and about 17.5 wt % PVOH.

BACKGROUND OF INVENTION

European Patent publication EP376687 discloses a paint stripper made with water insoluble organic plasticizers, water soluble organic solvents and polyvinyl formal—a formaldehyde acetal made by reacting PVOH with formaldehyde.

Japanese Patent publication JP52018737 discloses a paint stripper comprising dichloromethane and polyvinyl formal.

German Patent publication DE3235899 discloses a correcting agent for dry removal of inks on a non-absorbing substrate comprising polyvinyl butyral and organic solvents.

Japanese Patent publication JP61223071 discloses a liquid ink eraser comprising polyvinyl butyral and organic solvents.

Solutia Inc.'s Product Bulletin 2149204B discloses Santosol DME solvents in organic-based and water-based formulations for paint strippers and cleaners.

SUMMARY OF THE INVENTION

The invention provides paint stripper compositions which can be environmentally safe, i.e. are readily biodegradable. Such paint stripper compositions comprise DME, PVB and water which can be mixed to provide an emulsion. Certain embodiments of the invention also comprise water soluble organic solvents, water-miscible organic solvents, surfactants, emulsifiers, thickeners and/or pigments. The invention further provides a method for removing paint from a substrate by applying the paint stripper compositions of the invention to the painted substrate, and removing the paint from the substrate.

DETAILED DESCRIPTION OF PREFERRED EMBODIMENTS

The paint stripper compositions of this invention comprise 10–99 parts, preferably 50–70 parts DME, 0.1–40 parts, preferably 3–10 parts PVB, and 1–90 parts, preferably 30–60 parts water. Certain embodiments of the invention also comprise water soluble organic solvents such as acetone, methanol, ethanol, ethylene glycol, and N,N-dimethylformamide; water-miscible organic solvents such as n-butanol, and tetrahydrofuran; surfactants and emulsifiers such as sodium stearate, sodium dodecylbenzene, sodium lauryl sulfate and ethoxylated nonylphenol; thickeners such as starch, polyvinyl alcohol, and Rheolate brand thickeners from Rheox, Inc.; and/or pigments such as titanium dioxide, carbon black, clay and silicon dioxide.

Emulsions useful as paint strippers can be prepared by any conventional method known in the art, such as by combining PVB, DME and water, followed by mixing, e.g. high shear mixing, until a sufficiently stable emulsion is achieved. Emulsions without stabilizers, e.g. surfactants, emulsifiers or thickeners, may separate on standing, e.g. for several hours or days or longer. A separated emulsion is restored by mixing.

The paint stripper compositions of the invention are used to remove paint from a substrate. Substrates include conventional painted substrates known in the art including, but not limited to, wood, metals, e.g. iron or steel, and plastics, e.g. polypropylene. As used herein, "paint" refers to paint, varnish, thermoset coatings, and the like that have been applied to the surface of a substrate.

EXAMPLES

Example 1

This example illustrates the preparation and use of paint stripper compositions of this invention consisting of DME, PVB and water. With reference to the compositions described in Table 1 PVB-1 was added to DME-1 then combined with water and agitated to form an emulsion of composition No. 1. Emulsions of compositions 2–11 were prepared by adding PVB-1 to the emulsion of composition No. 1. All of the emulsions of compositions 1–11 were stable after 1 hour. The emulsions of compositions Nos. 1–5 were evaluated after 3 days and found to be somewhat separated. When each emulsion was applied to varnish on wood, the varnish was vigorously stripped from the wood substrate. When each emulsion was applied to thermoset coatings on wood, the thermoset coatings were softened after overnight application allowing the thermoset coating to be peeled from the wood substrate.

TABLE 1

| Composition | PVB-1 | Balance |
|---|---|---|
| 1 | 1.5 pbw | 98.5 pbw DME-1/water (60:40) |
| 2 | 2.5 | 97.5 |
| 3 | 3.5 | 96.5 |
| 4 | 4.5 | 95.5 |
| 5 | 5.5 | 94.5 |
| 6 | 10 | 90 |
| 7 | 1.5 | 98.5 pbw DME-1/water (50:50) |
| 8 | 2.5 | 97.5 |
| 9 | 3.5 | 96.5 |
| 10 | 4.5 | 95.5 |
| 11 | 5.5 | 94.5 |

Example 2

This example illustrates the preparation and use of paint stripper compositions of this invention comprising additional organic solvent. The components of compositions 12 and 13 as described in Table 2 were mixed to form emulsions which were stable after 1 day.

TABLE 2

| Composition | PVB-1 | DME-1 | Water | solvent |
|---|---|---|---|---|
| 12 | 10 g | 30 g | 30 g | 30 g butyl acetate |
| 13 | 10 g | 30 g | 30 g | 30 g isoamyl ketone |

What is claimed is:

1. A paint stripper emulsion comprising 50–70 parts dimethyl esters of $C_4$–$C_6$ aliphatic dibasic acids, 3–10 parts polyvinyl butyral and 30–60 parts water.

2. A paint stripper emulsion comprising dimethyl esters of $C_4$–$C_6$ aliphatic dibasic acids, polyvinyl butyral and water; wherein said dimethyl esters comprise a mixture of about 17–25 wt % dimethyl succinate, 59–73 wt % dimethyl glutarate and 10–14 wt % dimethyl adipate.

* * * * *